US005527010A

United States Patent [19]

Kao

[11] Patent Number: 5,527,010
[45] Date of Patent: Jun. 18, 1996

[54] STAND FOR SUPPORTING AN ELONGATE OBJECT

[75] Inventor: Cheung C. Kao, North Point, Hong Kong

[73] Assignee: Boto (Licenses) Limited, Douglas, Isle of Man

[21] Appl. No.: 315,338

[22] Filed: Sep. 29, 1994

[51] Int. Cl.⁶ ................................. F16M 13/00
[52] U.S. Cl. ...................... 248/519; 248/188.7
[58] Field of Search ................. 248/519, 188.7, 248/188, 511, 514, 515, 516, 346, 527; 108/150; 47/40.5

[56] References Cited

U.S. PATENT DOCUMENTS

| | | | |
|---|---|---|---|
| 3,968,882 | 7/1976 | Mello | 248/188.7 X |
| 4,448,378 | 5/1984 | Binfare | 108/150 X |
| 4,653,710 | 3/1987 | Dickison | 248/188.7 |
| 4,763,866 | 8/1988 | Sinchok | 248/188.7 |
| 5,249,768 | 10/1993 | Edwards et al. | 248/188.7 |

FOREIGN PATENT DOCUMENTS 2208591  4/1989  United Kingdom ............ 248/523

*Primary Examiner*—Ramon O. Ramirez
*Attorney, Agent, or Firm*—Irell & Manella

[57] ABSTRACT

A stand for supporting an elongate object such as a Christmas tree in a substantially vertical orientation has a central tubular support (4) adapted to receive an end of the object, and a plurality of legs (12) releasably securable on the tubular support (4) so as to extend substantially radially therefrom, including lugs (20) which engage in slots (21) in the support to provide releasable fixing of each leg to the central support (4) at a first point on each leg, and a locking collar (10) which is slidably disposed on the support (4) securably overlying lugs (24) to engage each of the legs (12) at a second point thereon.

11 Claims, 6 Drawing Sheets

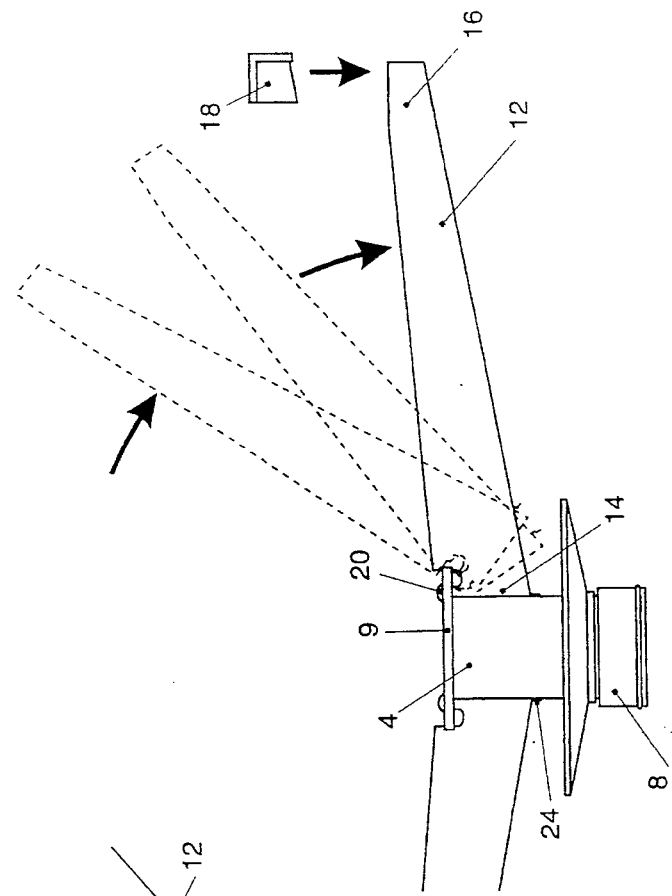
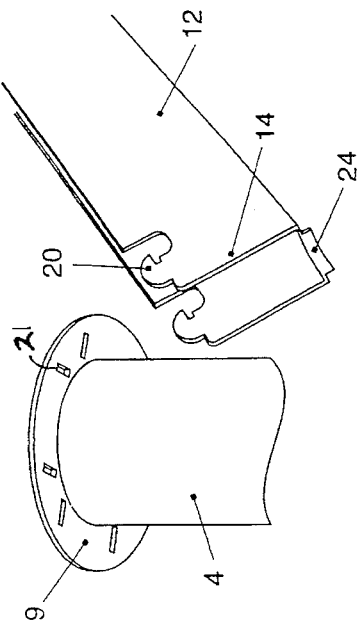
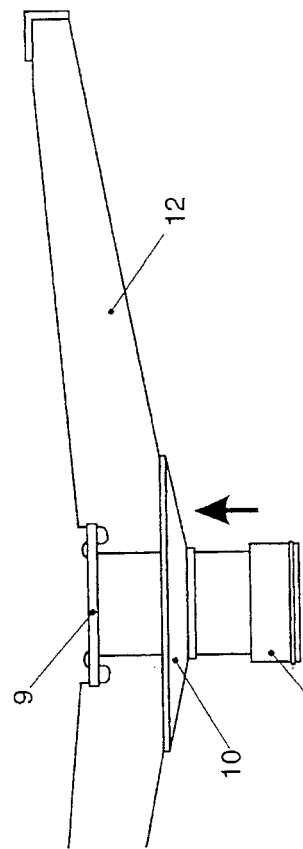
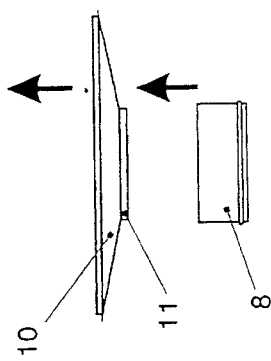

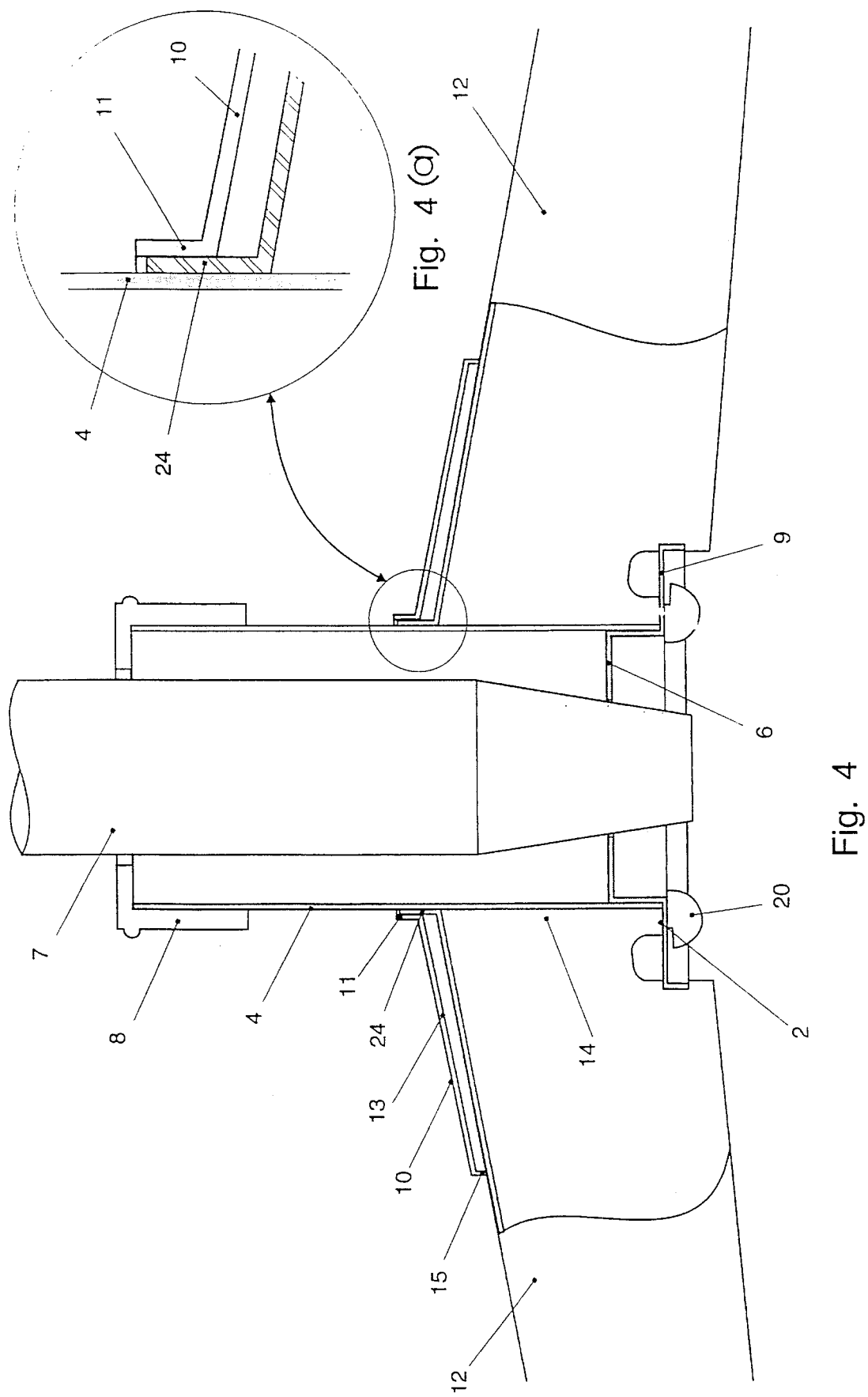

STAND FOR SUPPORTING AN ELONGATE OBJECT

FIELD OF INVENTION

The present invention relates to a stand for supporting in a substantially vertical orientation an elongate object. The invention relates in particular, but not exclusively to a stand for supporting trees, and in particular artificial Christmas trees.

DISCUSSION OF THE PRIOR ART

Stands for Christmas trees are generally provided with detachable legs so that they can be collapsed, which makes them easier to package and store at points of sale, easier to carry home when purchased, and means that after Christmas they can be collapsed and easily stored in the home. A conventional stand for artificial Christmas trees has a short central tubular member connected to the base of the trunk of the tree having slots cut therein extending from the bottom of this member, and a number of legs, usually three or four, which have corresponding grooves at an end region so that on assembly, the legs are pushed axially upwards into the slots. The slots may have detents which snap-fit over co-operating formations at the grooves.

This construction does not, however, retain the legs firmly. As a second or third leg is being fitted, an earlier fitted leg is often liable to disengage.

The present invention seeks to provide a construction which overcomes this problem.

SUMMARY OF THE INVENTION

According to the present invention, there is provided a stand for supporting an elongate object in a substantially vertical orientation, comprising a central tubular support adapted to receive an end of the object, and a plurality of legs releasably securable on the tubular support so as to extend substantially radially therefrom, including engagement means for releasably securing each leg to the central support at a first point on each leg, and a locking collar which is slidably disposed on the support to engage each of the legs at a second point thereon.

By providing engagement means at a first point on each leg and separate means which lock each leg onto the central support at a second point, a secure engagement can be achieved.

Preferably, the engagement means are adapted to allow engagement and release of the legs when the legs are in an orientation which is inclined relative to their final fitted orientation. This allows the locking collar to ensure non-releasable engagement of the first engagement means, providing a rigid secure attachment of the legs.

The engagement means may include a lug provided on each leg engagable in a corresponding slot provided in the central tubular support. In a preferred embodiment the legs are channel-shaped of inverted U-shaped section, each having a pair of lugs provided at a lower region of the end for attachment to the central tubular support for engagement in a corresponding pair of slots in the central tubular support. The central tubular support has a radially extending flange at its lower most region in which the slots are arranged. The lugs are preferably hook-like so that these can be hooked into and out of the slots when the legs are at the inclined orientation. At an upper region of an attachment end of each leg, there is provided a lug upstanding therefrom over which said locking collar is slidably engagable, in order to lock the upper region of the leg against the central support.

The central support is preferably provided at its upper end with a gripping portion in the form of an inwardly directed lip defining a central aperture for receiving the end of the object, the lip being deformable in order to provide a tight fit with the object. The lip preferably defines an aperture having a wavy edge profile, but alternatively, the lip may define a circular aperture which has a plurality of radially extending cuts therein, so that the lip is deformable.

BRIEF DESCRIPTION OF THE DRAWINGS

Embodiments of the present invention are now described, by way of example only, with reference to the following drawings in which:

FIG. 3(a) Illustrates the sequence of steps of assembly of a central support, locking collar and gripping collar;

FIG. 3(b) Shows the central support and a leg prior to connection;

FIG. 3(c) Illustrates the sequence of steps involved in attachment of a leg to the central support;

FIG. 3(d) Illustrates the final assembly step in securing a leg to the central support;

FIG. 4/4a Is a sectional view taken along the line A—A of FIG. 2(a);

DETAILED DESCRIPTION OF THE PREFERRED EMBODIMENT

Figure 1A:
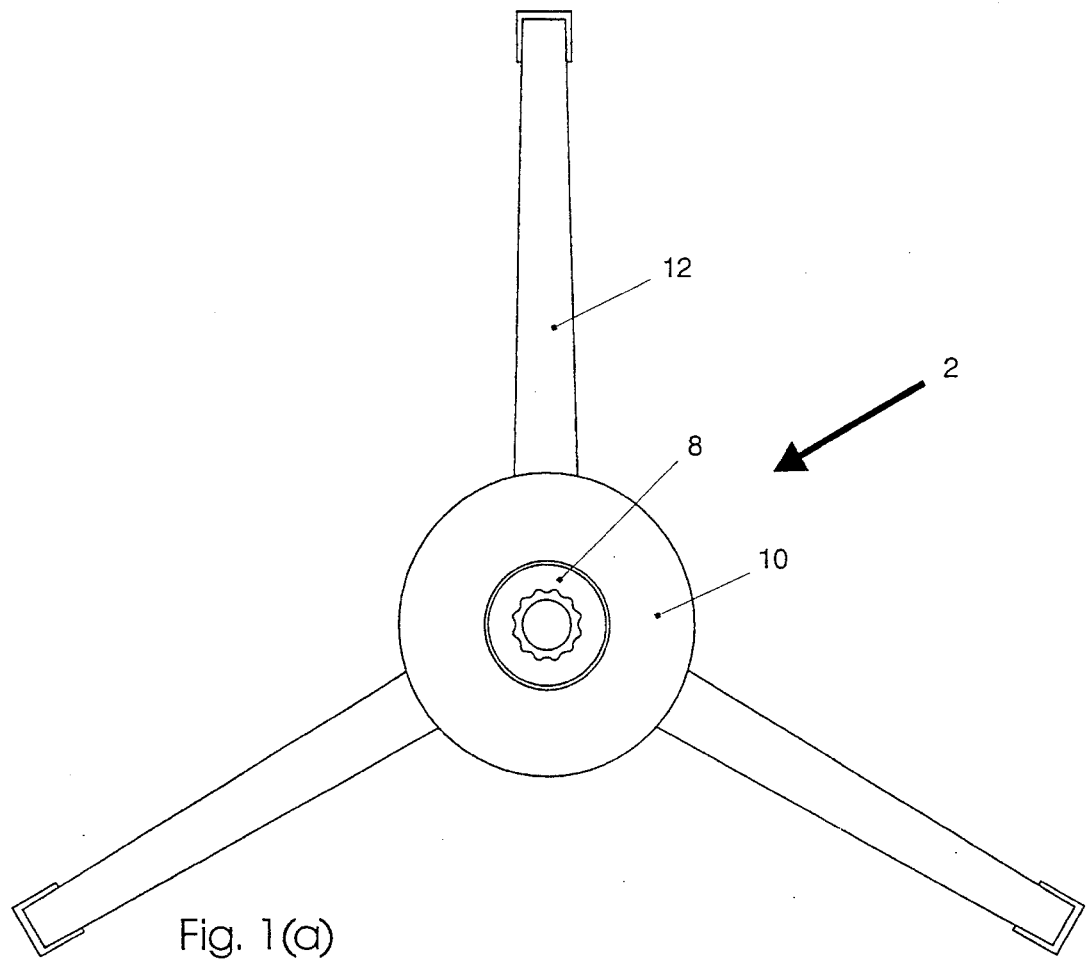
FIG. 1(a) Is a plan view of an assembled stand in accordance with a first embodiment of the invention.
Figure 1B:
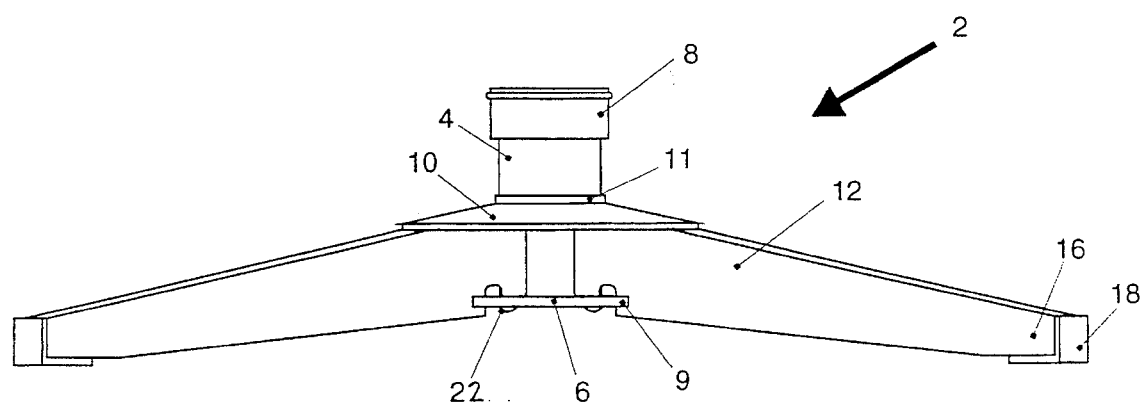
FIG. 1(b) Is a side view of the assembled stand of FIG. 1(a)

Referring to FIG. 1, this shows an assembled stand, generally designated 2. The stand comprises a tubular central support part 4 having an apertured base part 6 fitted thereto which in use receives a tapered bottom part of the tree trunk (designated 7 in FIG. 4). The base part 6 has an outwardly extending flange portion 9. The support 4 is provided at an upper region with a gripping collar 8 which in use grips the trunk, as is discussed in more detail below. The support 4 is also provided with a locking collar 10 which, as best seen in FIG. 4, has a short central tubular portion 11 and an outwardly flaring frustoconnical skirt portion 13 ending in a short tubular lip portion 15.

Figure 2:
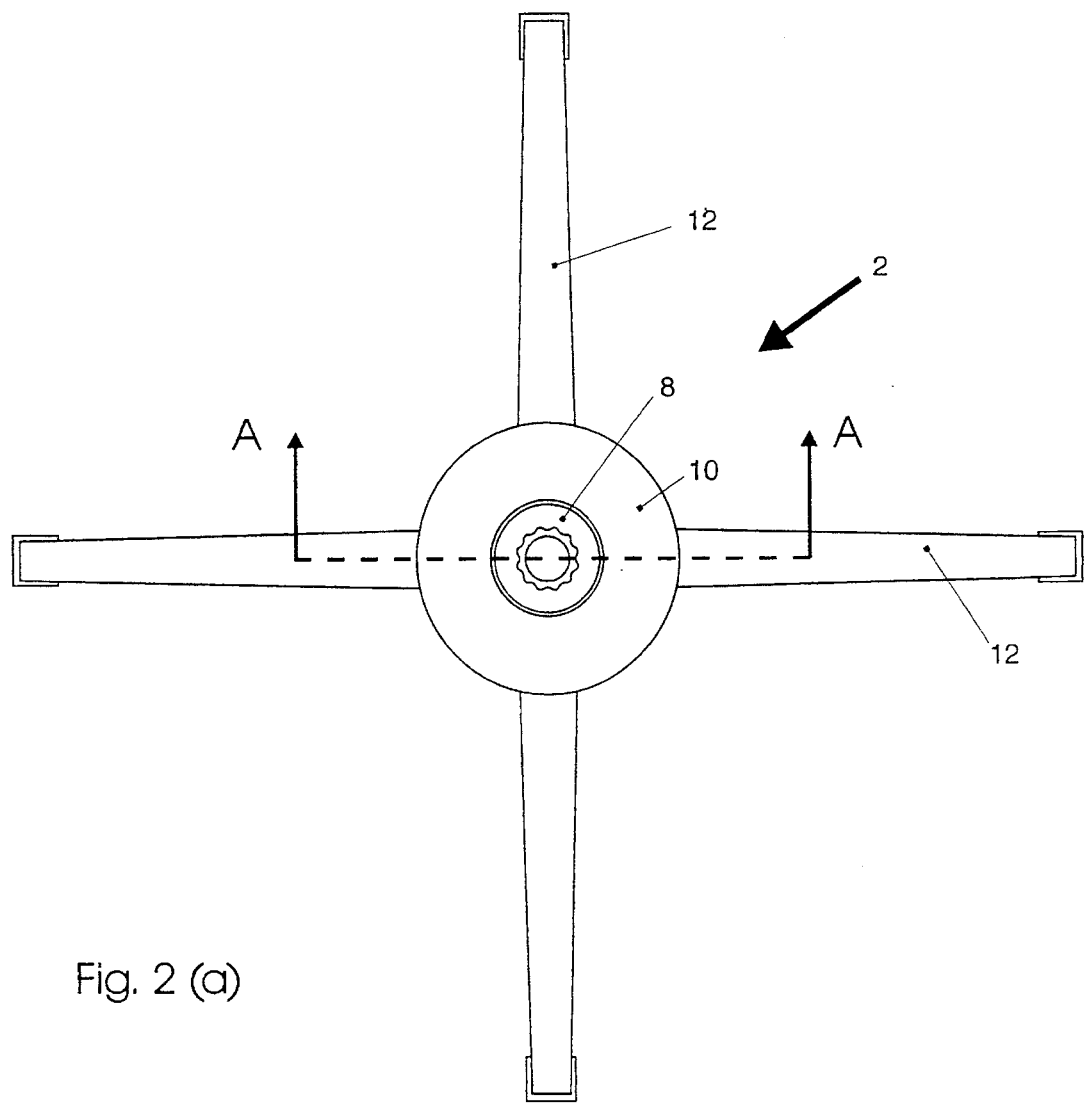
FIG. 2(a) Is a plan view of an assembled stand in accordance with a second embodiment of the invention.
FIG. 2(b) Is a side view of the assembled stand of FIG. 2(a)
Figure 2:
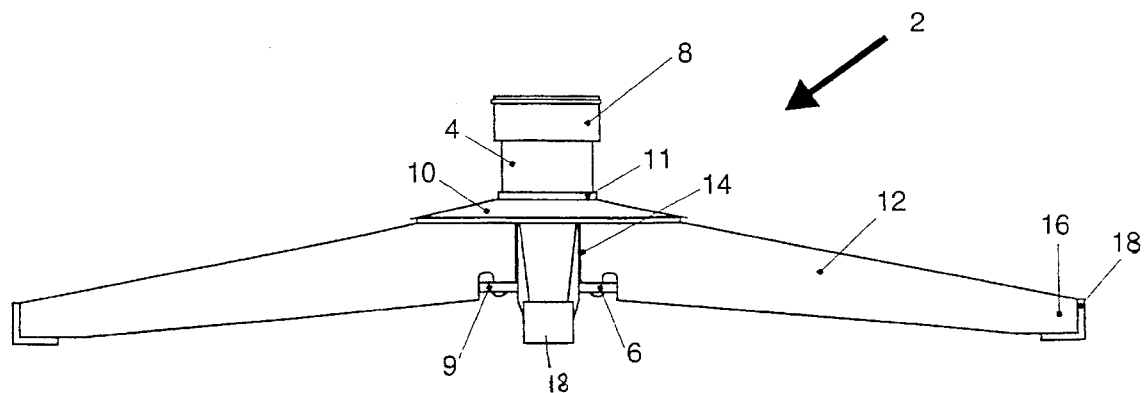

A plurality of legs 12 are provided for connection to the support member 4. The embodiment of FIG. 1 has three legs, whilst that of FIG. 2 has four legs, although it will be appreciated that a greater number could be provided if desired. Each leg 12 is a channel-shaped member of inverted U-shaped section (as best seen in FIG. 3(b)), having a leading or attachment end 14 for attachment to the support member 4 which is of greater depth than the opposite ground-engaging end 16. The ground-engaging end 16 is provided with a detachable foot 18.

As best seen in FIGS. 3(b) and 4, at a lower region of each leading end of each leg 12 there is provided a pair of shaped lugs 20. These lugs 20 fit through respective slots 21 in the lower flange 9 of the base part 6. Each lug 20 is itself shaped to have a slot 22 therein, whereby the lug is hook-like in shape so that these can be hooked into the slots 21 to provide a releasable yet secure engagement of the lower region of the legs. An upper region of each leg 12 is formed with an upwardly extending projection or lug 24 which is curved to match the curved outer surface of the support part 4, and which is locked against the support part 4 by the locking collar 10, as will be discussed further below.

Figure 5A:
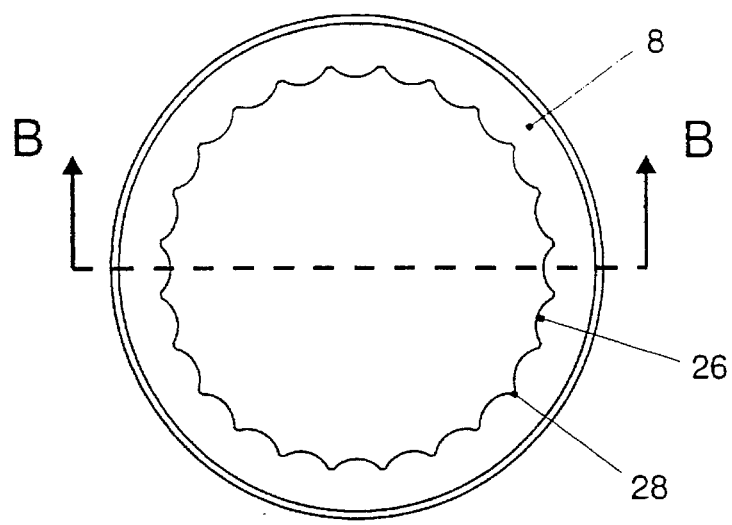
FIG. 5(a) Is a top view of a first gripping collar.
Figure 5B:
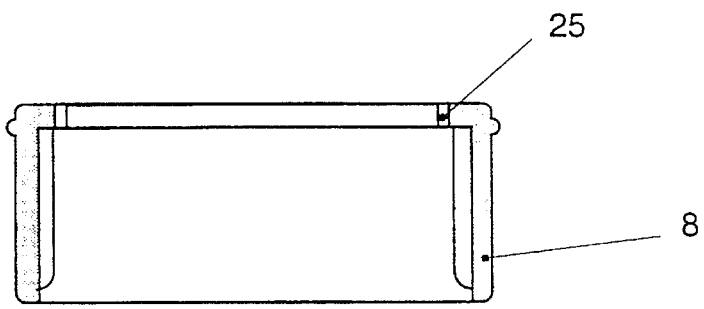
FIG. 5(b) Is a sectional view along the line B—B of FIG. 5 (a)
Figure 5C:
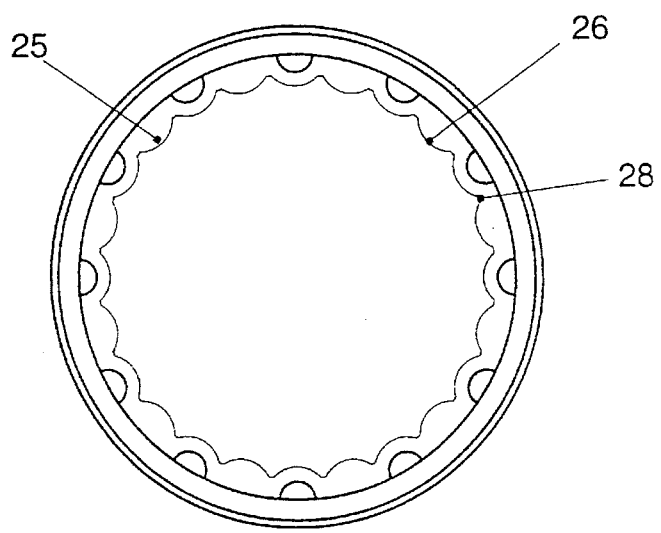
FIG. 5(c) Is a view from underneath of the first gripping collar.
Figure 6A:
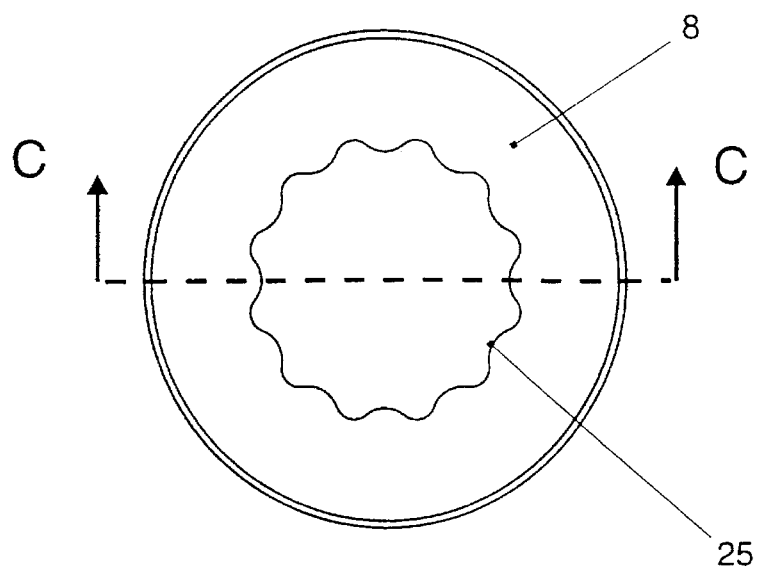
FIG. 6(a) Is a top view of a second gripping collar.
Figure 6B:
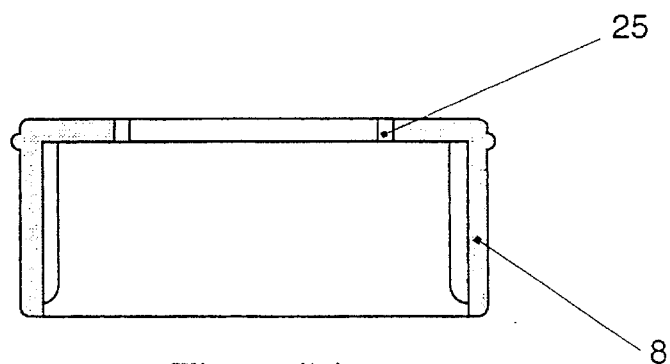
FIG. 6(b) Is a sectional view along the line C—C of FIG. 6(a)
Figure 6C:
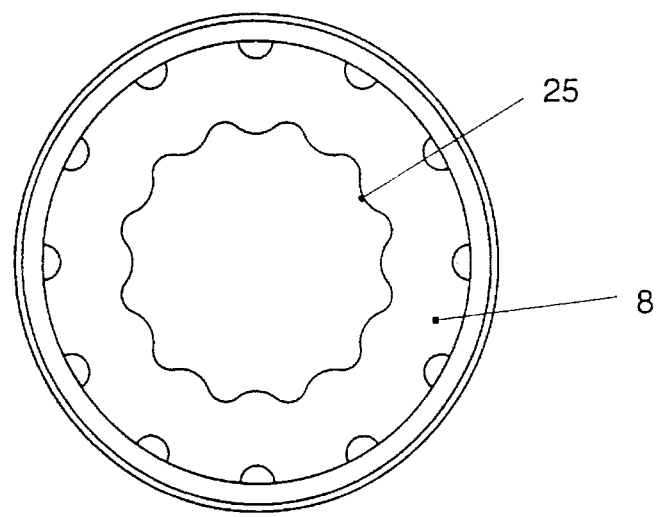
FIG. 6(c) Is a view from underneath of the second gripping collar.

As best seen in FIGS. 5 and 6, the gripping collar 8 is a tubular member provided with an inwardly extending lip 25 defining a central aperture in which the tree trunk is inserted. This lip 25 has a wavy edge profile made up of inwardly directed peaks 26, separated by recesses 28. The gripping collar 8 is preferably formed of a relatively resilient plastics material, so that as the tree trunk 7 is inserted, the peaks 26 are deformed outwardly, so that the trunk is tightly gripped therein. It will be appreciated that a particular gripping collar 8 will be intended for use with a tree with a trunk of a particular diameter. FIG. 5 shows a gripping collar 8 used to accommodate a trunk of 5.08 cm (2 inches) diameter, whilst FIG. 6 shows a gripping collar used to accommodate a 3.18 cm (1.25 inches) diameter trunk.

As an alternative, the collar may have a lip defining a smooth circular aperture, but provided with a plurality of short radially extending cuts, so that the edge of the collar can deform on insertion of the tree trunk.

The operation of assembly of the stand is carried out in the manner now described with reference to FIG. 3. Firstly, the locking collar 10 and gripping collar 8 are push-fitted on to the end of the central support 4, as shown in FIG. 3(a). Subsequently, each leg 12 is fitted on to the support 4 by hooking the lugs 20 into the corresponding slots 21 in the base with the legs at an inclined orientation as indicated in FIG. 3(b), and then levering the legs downwardly in the manner as shown in FIG. 3(c) until the legs are perpendicular to the axis of the tubular support 4 with the lugs 24 abutting the central support 4. FIG. 3(c) also shows a foot 18 being push-fitted on to the end of a leg 12. When all the legs 12 have been fitted in this manner, the locking collar 10 is pushed upwardly, as shown in FIG. 3(d), so that the central tubular portion 11 overlies the lugs 24 as best seen in the inset of FIG. 4, thereby locking the legs in position. In this position, the lip 15 of the locking collar 10 also engages the top of the legs, providing further rigidity. The stand is now assembled, and should be inverted so that the trunk of the tree can now be push-fitted into the gripping collar 8.

What is claimed is:

1. A stand for supporting an elongate object in a substantially vertical orientation, comprising a central tubular support adapted to receive an end of the object, and a plurality of legs releasably securable on the tubular support so as to extend substantially radially therefrom, including engagement means for releasably securing each leg to the central support at a first point on each leg, wherein the engagement means are adapted to allow engagement and release of the legs when the legs are in an orientation which iS inclined relative to their final fitted orientation, and a locking collar which is slidably disposed on the support to engage each of the legs at a second point thereon.

2. A stand according to claim 1 wherein the central support is provided at its upper end with a gripping portion in the form of an inwardly directed lip defining a central aperture for receiving the end of the object, the lip being deformable in order to provide a tight fit with the object.

3. A stand according to claim 1 wherein the engagement means include a lug provided on each leg, engagable in a corresponding slot provided in the central tubular support.

4. A stand according to claim 3, wherein the lugs are hook-like and are insertable and removable from the slots when the legs are in the inclined orientation.

5. A stand according to claim 4, wherein the legs are channel-shaped of inverted U-shape section, each having a pair of lugs provided at a lower region of the end for attachment to the central tubular support for engagement in a corresponding pair of slots in the central tubular support.

6. A stand according to claim 5, wherein the central tubular support has an outwardly extending flange at its lowermost region in which the slots are arranged.

7. A stand according to claim 6 wherein at an upper region of an attachment end of each leg, there is provided a lug upstanding therefrom over which the locking collar is slidably engagable, in order to lock the upper region of the leg against the central support.

8. A stand according to claim 7 wherein the locking collar comprises a short central tubular sleeve portion which overlies the upstanding lugs when moved to engage the lugs.

9. A stand according to claim 8 wherein the locking collar further comprises frustoconnical skirt portion, and an outer tubular lip which engages the legs.

10. A stand according to claim 2 wherein the lip defines a circular aperture which has a plurality of radially extending cuts therein, so that the lip is deformable.

11. A stand according to claim 2 wherein the lip defines an aperture having a wavy edge profile.

* * * * *